United States Patent Office 3,289,743
Patented Dec. 6, 1966

3,289,743
ISOTHERMIC HEAT EXCHANGERS
Attila Biro, Miskolc, Hungary, assignor to Nikex Nehezipari Kulkereskedelmi, Vallalat, Budapest V, Hungary
Filed June 15, 1964, Ser. No. 388,339
Claims priority, application Hungary, Aug. 2, 1963, BI-180
3 Claims. (Cl. 165—10)

The invention relates to an apparatus hereinafter called isothermic regenerator which is suitable for utilizing the heat content of gases departing from industrial establishments, mainly flue gases. According to the invention, the said apparatus works by heating the media participating in the process of burning, the fuel and the combustion air to a high temperature, utilizing the heat content of the flue gases, while the temperature of the preheating remains constant in time.

The known heat exchangers may be divided into two main groups. In the case of regenerators, flue gases are led through the material arranged in the regenerator chambers, so that the hot flue gases heat the material. In the subsequent period of time the medium to be preheated is allowed to flow through the heated material. During this period, the heated material transmits part of its heat content to the medium to be heated. Two regenerators are coupled, one is always heated and the other always cooled. As heat absorbing material, normal fire-bricks or heat-resistant form pieces are arranged in the regenerating chambers. In certain particular cases and at low temperatures form pieces made of metal may be used.

An inconvenient disadvantage of known regenerators lies in the fact that the end temperature of the medium which had been preheated during the heating period changes to a considerable extent, i.e., the temperature is much higher at the beginning than at the end of the said period, owing to the fact that the temperature of the heat transmitting material, the so-called checker, decreases rapidly and substantially during the heating period.

The high temperature of the checker requires the use of a heat-resistant material, since metals are melted or soon oxidized. The heat transfer factor is rather low at the surface of the checkers built from heat resistant material during both periods. For this reason as well as for reasons of strength, the volume of the checker must be rather large, and the building-in of a material which hardly participates in the heat exchange may become necessary.

The sealing or packing of such large regenerator chambers presents difficulties. Accordingly, the pressure of the media flowing through them may only be low, a few millimetres of water column. Hence, the media pass to the burner under low pressure, which is detrimental for the mixing conditions, and flow velocity in the hearth is reduced. The deterioration of mixing conditions in turn decreases the temperature of the flame, whereas the decrease of flow velocity impairs convective heat transfer. All this results in the efficiency of the furnace being lowered.

It has been attempted to obviate the described drawbacks of regenerators, and another type of heat utilizing apparatus, i.e., the contact heat exchangers or recuperators were developed and gained wide ground. In these, the medium to be heated as well as the flue gases flow along the same path. Heat exchange takes place through the partition wall dividing the two media from each other, consisting of metal or a heat-resistant material. In accordance with the shape of the body housing the medium to be heated, the metallic contact heat exchangers are provided with tubes, plates or castings. Their advantage lies in the possibility of raising the pressure of the preheated medium, so that the drawback of low pressure appearing in regenerators is obviated. Furthermore, the end temperature of the preheated medium is constant in time. There exists, however, the disadvantage that the temperature of the preheated medium can only be comparatively low, since it is required to ensure an appropriate difference of temperature between the flue gas and the external surface of the recuperator on the one hand, and between the medium to be preheated and the inner surface of the recuperator on the other. Hence, the permissible working temperature of the recuperator is restricted.

The strength of the material decreases rapidly in the case of temperatures above 700° C. in metallic recuperators, a circumstance by which the pressure of the preheated medium is limited. Should the pressure exceed 400 to 500 mm. of water column, the recuperator would suffer a deformation.

In order to be able to apply higher preheating temperatures, ceramic recuperators have been used. These, however, are too voluminous and can furnish agents of low pressure only.

A common drawback of the various kinds of recuperators is that the working media may, more or less, pass (drain) into each other. This mainly occurs in ceramic recuperators, in which such drainage may go as far as 50 percent.

It is the object of the invention to provide a heat exchanger which is devoid of the disadvantages and shortcomings of the known types of regenerators as well as recuperators and is suitable for supplying a high-pressure medium preheated to a high and temperature constant in time, which has a long useful life and permits an optimum utilization of the heat content of flue gases, without being voluminous.

The invention realizes the above outlined objective by using special hollow elements arranged in the recuperator chamber, and enclosing in their cavities materials of known melting points, such as metals, metal alloys or salts. If the melting point of the materials enclosed in the cavities is adequately selected, the materials will melt in the heating period and solidify during the cooling period. In such manner the amount of heat transmitted from the flue gases to the elements will be accumulated by the material in the cavities as melting heat. If the period of time is appropriately determined so that the entire amount of material is just melted, i.e., just solidified during the cooling period, then the elements are able to accumulate large quantities of heat without materially altering their temperature. In this manner, a preheated medium of practically identical end temperature is supplied by the regenerator during the term of the entire period of time, since the temperature of the heat transferring surface is not considerably changed.

The elements enclosing the heat-accumulating substance are preferably prepared by casting metals, and their surface is preferably extended by means of providing thereon ribs, needles, etc., so that the value of the heat transfer factor is elevated to a multiple of the value usual in regenerators. Due to the melting heat of the material enclosed in the cavities, greater quantities of heat may be accumulated with equal masses than by raising the physical heat quantity, the heating surface and the mass of the regenerator will amount to only a fraction of those of the conventional regenerator types. Thus, space requirement and accordingly manufacturing costs are also cut down.

If the regenerator in accordance with the invention, which has a small volume, is enclosed in a metallic casing, the pressure of the preheated medium may be increased as desired.

The material arranged in the cavity or cavities of the elements shall have a melting heat of at least 9000 B.t.u./cubic feet. The solid and liquid phase shall occur together within the smallest possible temperature range not surpassing ±25 centigrades, having a well-defined melting point or point of solidification. The substance must be inexpensive, and shall not noticeably attack the material of the elements at working temperature.

The material must have high heat resistance and heat conductivity, and its strength properties must withstand working temperature. Advantageously the material to be used shall have appropriate plasticity.

Various materials shall be applied for filling the castings of one regenerator. The filling to be used at the point of introduction of the flue gas shall have an elevated melting point, and the melting points of the filling materials shall be so selected as to change in the direction of the height of the regenerator in such a manner that the difference between the melting points and the temperatures of the cooling flue gases shall remain practically the same. This can be set and readily determined by means of known methods of calculation. The melting points of the individual filling materials may be set as desired, by selecting appropriate metals, metal alloys, salts or mixtures of salts.

Any desired intermediate working temperature may be set by using metal, advantageously Mn, Al, Ga, Zn, Cr, Ni, Cu, their alloys, halogenides, nitrates, oxides, sulphates, carbonates or chromates. In this way the regenerator may be readily dimensioned to suit any desired purpose. The filling material may also consist of a solid solution of the listed materials, or of their mixtures or eutectics.

By appropriate choice of the material of the elements and of the filling materials, the heating of the medium up to a temperature of 1000 centigrades may be effected under any desired pressure with good efficiency and economically, and the temperature of the medium remains practically unchanged in time.

By way of example, a regenerator constructed in accordance with the invention as shown in the drawing, in which.

Figure 1:
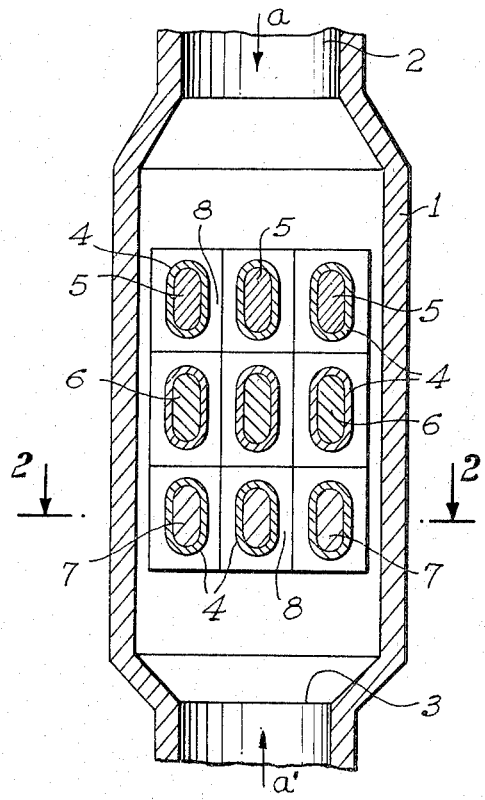
FIG. 1 is a longitudinal sectional view taken along line 1—1 of FIG. 2.
Figure 2:
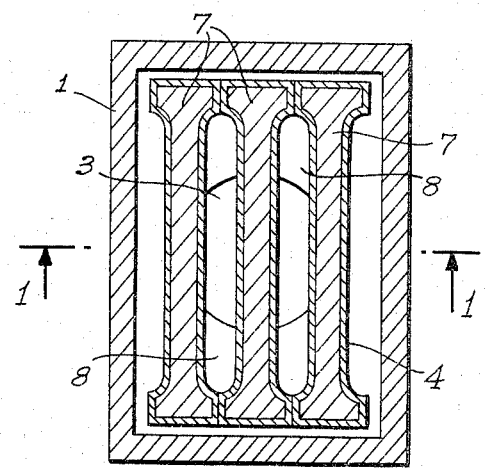
FIG. 2 is a transverse sectional view taken along line 2—2 of FIG. 1.

Referring to the drawing, a heat exchanger casing 1 is connected, at opposite ends, to medium pipes 2 and 3. The heat discharge medium flows in the direction of arrow $a$ through medium pipe 2 and the heat absorbing medium flows in the direction of arrow $a'$ through medium pipe 3, the flow through the respective medium pipes occurring periodically, as is customary in regenerators. A plurality of casings 4, nine of such being shown, are mounted within the regenerator casing and each of the casings is filled with selected materials 5, 6 and 7 as discussed above. In each row of casings 4 at progressive levels in the regenerator, the materials are the same or have the same melting point which differs from the melting point of the material in the next row of casings. In the embodiment shown, material 5 would have a higher melting point than material 6 and the material 7 in the lowermost row would have the lowest melting point. The melting point of the materials are selected in accordance with the working temperatures as will be apparent from the example set forth below. As best seen in FIG. 2, the outside surface of each adjacent casing 4 defines a duct 8 whose longitudinal axis extends in the direction of medium flow thereby defining passageways through the regenerator for the flow of heat discharge medium in the direction of arrow $a$ and the flow of heat absorbing medium in the direction of arrow $a'$.

The isothermic regenerator according to the invention is excellently suited for use in a wide range of industrial furnaces, such as in rolling mills or forge shops, in furnaces for heat treatment, in heating, melting, and other types of furnaces. It is also adapted to preheat the air in cupola furnaces, blast furnaces and other shaft furnaces, for chemical purposes, etc.

As an embodiment by way of example, the elements placed in the zone of elevated temperature may consist of heat-resistant steel and filled with 37.25% of

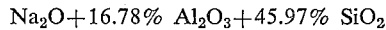
$$Na_2O + 16.78\%\ Al_2O_3 + 45.97\%\ SiO_2$$

The working temperature of these elements is 905 centigrades. In cooler working zones the elements may be made of cast iron with a content of Si, and the cavities may be filled with aluminum. The working temperature of such elements is 650 centigrades. In still cooler zones the elements may consist of simple (common) cast iron and may be filled with a mixture of 77.25%

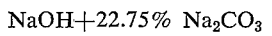
$$NaOH + 22.75\%\ Na_2CO_3$$

with a working temperature of 286 centigrades.

What I claim is:

1. In a heat exchanger containing a regeneration section through which a hot fluid medium at a predetermined temperature is passed and cooled and through which a cold fluid media maintained at a temperature below said predetermined temperature is passed and heated to said predetermined temperature, said fluid media being selected from the group consisting of liquid and gas; the improvement in that said regeneration section contains a plurality of longitudinally disposed zones which contact said cold and hot fluid media, the first zone which contacts the hot fluid media contains a plurality of hollow elements formed from a heat resistant material having enclosed in their cavities a fusible material having a melting point at about said predetermined temperature, each of the other said zones having a plurality of hollow elements formed from a heat resistant material and containing enclosed therein a fusible material having a melting point lower than the melting point of the fusible material contained in the hollow elements of said first zone, the melting point of the fusible material within a zone which first contacts the hot fluid media being greater than the melting point of a material within a subsequent zone which later contacts said hot fluid media, said fusible material within each of said zones being disposed in said section to thermally contact the hot and cold fluid media, and said fusible material within each of said zones being adapted upon thermal contact with said hot and cold fluid media to change its physical state.

2. The improvement according to claim 1, wherein the fusible material in each of said zones has a heat of fusion of greater than 9,000 B.t.u./cubic feet and the temperature range between the solid and liquid states of said fusible material being greater than ±25° C. about the melting point of the fusible material.

3. The improvement according to claim 1, wherein said fusible metal is selected from the group consisting of metals, metal alloys, metal salts, metal hydroxides, metal oxides, metal silicates and mixtures thereof.

References Cited by the Examiner

UNITED STATES PATENTS

| | | | |
|---|---|---|---|
| 2,167,901 | 8/1939 | Murray | 165—104 |
| 2,338,691 | 1/1944 | Tucker | 165—104 X |
| 2,407,095 | 9/1946 | Olson. | |
| 2,813,698 | 11/1957 | Lincoln | 105—105 X |
| 2,825,034 | 2/1958 | Birchard | 165—104 X |

FOREIGN PATENTS

| | | |
|---|---|---|
| 542,637 | 1/1932 | Germany. |
| 366,528 | 2/1932 | Great Britain. |
| 569,396 | 5/1946 | Great Britain. |

ROBERT A. O'LEARY, *Primary Examiner.*

M. A. ANTONAKAS, *Assistant Examiner.*